Dec. 6, 1932. N. H. MOTSINGER 1,889,931
LAWN MOWER
Filed Feb. 24, 1931
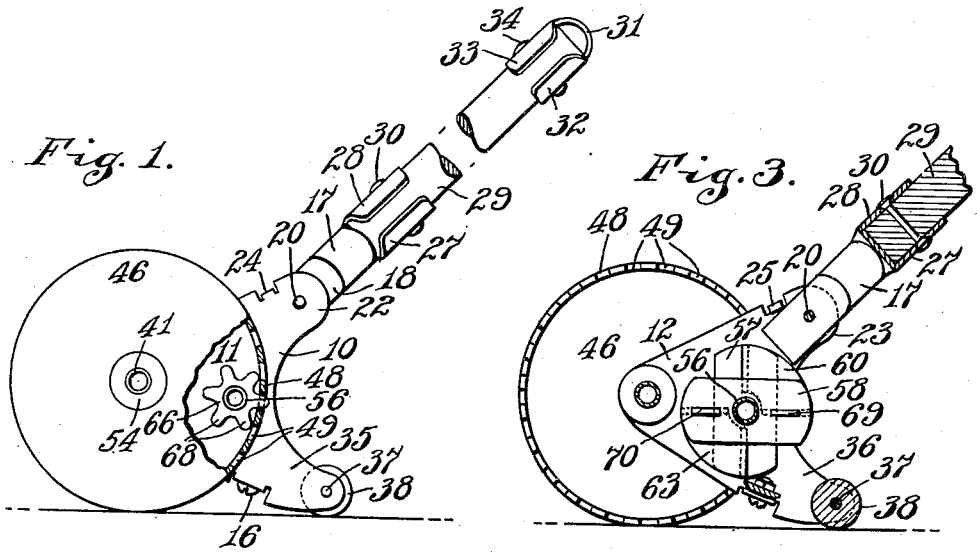
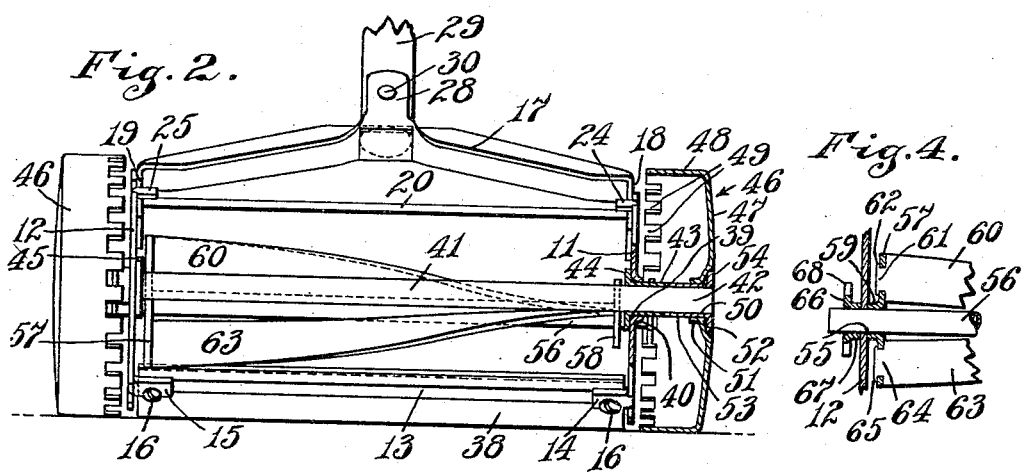
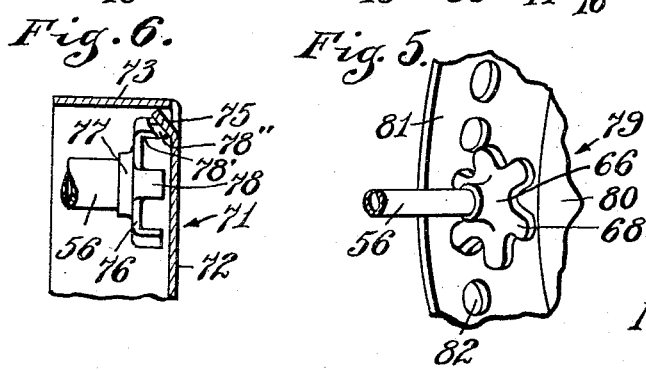
Inventor
Newell H. Motsinger,
By Hood + Hahn.
Attorneys Patented Dec. 6, 1932

1,889,931

UNITED STATES PATENT OFFICE

NEWELL H. MOTSINGER, OF MARION, INDIANA

LAWN MOWER

Application filed February 24, 1931. Serial No. 517,684.

The present application relates to a lawn mower, and more particularly to a toy lawn mower of extremely inexpensive construction.

The primary object of the invention is to provide a lawn mower of the character described which shall be so inexpensive as to be marketable at a very low price, light enough to be handled by a small child, very simple in construction, and yet sturdy enough to stand up under the abuse to which children's toys are subjected, and which shall be capable of actually cutting grass. Further objects of the invention will appear as the description proceeds.

To the accomplishment of the above and related objects, my invention may be embodied in the forms illustrated in the accompanying drawing, attention being called to the fact, however, that the drawing is illustrative only, and that changes may be made in the specific constructions illustrated and described, so long as the scope of the appended claims is not violated.

Fig. 1 is a side elevation of a lawn mower constructed in accordance with my invention, parts thereof being broken away for clarity of illustration;

Fig. 2 is a front elevation thereof, partly in section;

Fig. 3 is a substantially central section therethrough;

Fig. 4 is a sectional view of a detail;

Fig. 5 is a fragmental perspective view of a modified form; and

Fig. 6 is a fragmentary section of a further embodiment.

Referring to the drawing, and more particularly to Figs. 1 to 4 inclusive, it will be seen that my invention contemplates a sheet metal frame 10 comprising a pair of substantially parallel ears 11 and 12 connected at their lower portions by a cutter bar 13. Preferably, the frame is formed of sheet metal stampings, the ear 11 having a tongue 14 punched away and bent inwardly, and the ear 12 having a similar tongue 15, the cutter bar 13 being secured to the tongues 14 and 15 through the medium of screws 16.

A yoke 17, preferably comprising a sheet metal strip formed into a half round channel is provided with forwardly extending parallel arms 18 and 19 oscillably mounted on a rod 20 extending between and secured to the portions 22 and 23 of the ears 11 and 12, respectively. The ear 11 is provided with a tongue 24 punched out and bent inwardly to form a stop for the arm 18, and the ear 12 is similarly formed with a tongue 25 similarly cooperating with the arm 19. As will be obvious, the tongues 24 and 25 prevent the yoke 17 from oscillating, in a clockwise direction as viewed in Figs. 1 and 3, beyond the position illustrated in said figures.

Adjacent its midpoint, the yoke 17 is provided with a pair of upwardly and rearwardly extending half round projections 27 and 28 forming a socket for the lower end of a handle bar 29, said bar being secured in the socket through the medium of a rivet 30 passing through said projections and said bar.

At the upper end of the handle bar 29 there is mounted a handle comprising a half round strip 31 having projections 32 and 33 embracing the upper end of the handle bar and secured thereto by a rivet 34 passing through said projections and said bar.

The lower projections 35 and 36 of the ears 11 and 12, respectively, are perforated for the reception of a shaft 37 upon which is mounted a roller 38 of the usual construction.

Adjacent its forward end, the ear 12 is formed with a perforation 39 surrounded by an outwardly projecting annular flange 40. As will be obvious, the perforation and its flange may be formed simultaneously by a punching operation. A tubular rod 41 has its one end 42 mounted in the perforation 39 and extending therethrough beyond the ear 11, and has its opposite end similarly mounted in a similar perforation in the ear 12 and extending beyond said ear. As will be obvious from an inspection of Fig. 2, the diameter of the rod 41 is somewhat less than the diameter of the perforation 39, and a sleeve 43, having a press fit on the rod 41 is inserted in said perforation, having bearing in the flange 40. The sleeve 43 is preferably formed with an integral peripheral flange 44 which is adapted to engage the inner surface of the ear 11. A similar sleeve is mounted adjacent the opposite end of rod 41, its flange 45 bearing against the inner surface of ear 12, whereby the sleeves with their flanges 44 and 45 hold the rod 41 against longitudinal shifting.

On the projecting end 42 of the rod 41 there is mounted a wheel indicated generally at 46 and comprising a base portion 47 and a flange 48 projecting inwardly from said base portion. The wheel 46 is preferably formed of a single piece of sheet metal stamped or pressed to the cup shape illustrated. The free edge of the flange 48 is notched, as at 49, to form teeth or castellations for a purpose later to be described. The base portion 47 of the wheel is centrally formed with a perforation 50 surrounded by an inwardly projecting annular flange 51, and the region immediately surrounding said perforation is inwardly concaved, as at 52.

The perforation 50 is of a diameter somewhat in excess of the diameter of the end 42 of the rod 41, and a sleeve 53, having a press fit on the rod end 42 is received within said perforation, having bearing in the flange 51. Preferably the inner end of the sleeve 53 abuts the outer end of the sleeve 43. The outer end of the sleeve 53 is formed with a peripheral flange 54 adapted to be received in the concaved portion 52 of the wheel base 47, so that said flange 52 lies substantially flush with the surface of the wheel base 47. A similar wheel 46 is mounted on the opposite end of the rod 42.

At a point spaced to the rear and somewhat below the location of the perforation 39, the ears 11 and 12 are formed with alined perforations. In Fig. 4, the perforation 55 in the ear 12 is shown. A tubular shaft 56 has its ends received in said perforations and projecting outwardly beyond the ears 11 and 12. The tubular shaft 56 has mounted thereon a pair of carrier members 57 and 58. The member 57 is centrally perforated, the perforation being surrounded by an outwardly projecting annular flange 59, and the diameter of the opening through said flange is such as to give the member 57 a press fit on the shaft 56. Said member 57 is mounted on said shaft adjacent one end thereof with the flange 59 in abutment, or substantially in abutment, with the inner surface of the ear 12. The member 58 is similarly formed and is mounted with its flange substantially in contact with the inner surface of the ear 11.

As is clearly shown in Figs. 2 and 3, each of the carrier members 57 and 58 is formed with two alined slots, said slots being disposed on opposite sides of the shaft 56. The carrier members are so disposed that the plane defined by the axis of the shaft 56 and the slots in the member 57 is perpendicular to the plane defined by the axis of the shaft 56 and the slots of the member 58. A blade strip 60 is formed at its one end with a reduced portion 61 received in one of the slots of the carrier member 57, extending therethrough, and headed over against the outer surface of said member, as at 62. A second blade strip 63 is similarly formed with a reduced extension mounted in the other slot of the member 57, extending therethrough, and being headed over as at 65. The opposite end of the blade strip 60 is secured in one slot of the carrier member 58, its reduced extension being headed over against the outer surface of said member as at 69, and the corresponding end of the strip 63 is similarly secured in the other slot of the member 58, being headed over as at 70. As will be obvious, this arrangement provides for a 90° twist in each of the blade strips 60 and 63.

A pinion 66 is formed with a central aperture surrounded by an axially projecting annular flange 67, and said flange has a press fit on the projecting end of the shaft 56, the flange substantially abutting the outer surface of the ear 12. The pinion 66 may be a stamping, formed of sheet metal, teeth 68 being formed around its periphery by cutting notches therein. Preferably, a pinion similar to the pinion 66 is mounted on the opposite end of the shaft 56, bearing against the outer surface of the ear 11. Obviously, the teeth 68 of the pinion or pinions 66 mesh with the castellations of the flange or flanges 48 of the wheel or wheels 46.

As an alternative to the arrangement disclosed in Figs. 1 to 4 inclusive, I have illustrated in Fig. 5 a fragment of a wheel 79 comprising a base portion 80 and a flange portion 81. In said flange portion, there are formed a plurality of punched holes 82 adapted to mesh with the teeth 68 of the pinion 66 mounted on the shaft 56.

A still further form is illustrated in Fig. 6, the same comprising a wheel 71 comprising a base portion 72 and a flange 73. At spaced points about the periphery of the base portion 72, there are provided punched-up tongues 75. A crown gear 76, preferably comprising a sheet metal stamping having a perforation therein surrounded by an annular flange 77, is adapted to have a press fit on the end of the shaft 56. The gear 76 is provided with a plurality of axially projecting teeth 78, 78', and 78''. As will be obvious, the tongue 75 is illustrated, in Fig. 6, as between the tooth 78'' and the tooth 78', a portion of which is broken away to permit complete illustration of the tongue 75.

I claim as my invention:

1. In a lawn mower, a frame, a rod mounted transversely in said frame, a pair of cup-shaped stamped-metal wheels mounted at opposite ends of said rod for rotation with respect to said frame, the bases of said cup-shaped wheels facing outwardly, and the annular flanges of said wheels being castellated, a shaft mounted in said frame and paralleling said rod, a blade carried by said shaft, and a gear carried on said shaft and meshing with the castellations of one of said wheels.

2. In a lawn mower, a frame including a pair of spaced, parallel ears, said ears being formed with alined perforations, a rod mounted in said perforations, and a pair of sleeves having a press fit on said rod and received in said respective perforations, each of said sleeves being formed at one end with a peripheral flange engaging the inner face of one of said ears.

3. In a lawn mower, a frame including a pair of spaced, parallel ears, said ears being formed with alined perforations, a rod mounted in said perforations, a pair of wheels mounted on the projecting ends of said rod, each of said wheels being formed with an aperture receiving a rod end, and with an inwardly concaved portion surrounding said aperture, and a sleeve cooperating with each of said wheels, each of said sleeves having a press fit on said rod, being received in said aperture, and being provided with a peripheral flange at its one end received within said concaved portion.

4. In a lawn mower, a sheet metal frame including a pair of spaced ears, said ears being formed with alined perforations and each of said perforations being surrounded by an outwardly projecting annular flange, a rod mounted in said perforations and projecting outwardly beyond each of said ears, a pair of sleeves having a press fit on said rod and received in said respective perforations and having bearing within said respective flanges, each of said sleeves being formed at one end with a peripheral flange engaging the inner face of one of said ears, a pair of wheels mounted on the projecting ends of said rod, each of said wheels being formed with an aperture receiving a rod end and surrounded by an inwardly projecting annular flange, and each of said wheels further being formed with an inwardly concaved portion surrounding said aperture, and a sleeve having a bearing within said flange of each of said wheels, each of said sleeves having a press fit on said rod, and being provided with a peripheral flange at its one end received within said concaved portion.

5. In a lawn mower, a frame, a blade-carrying shaft journalled in said frame, a gear carried on said shaft without said frame, and a pair of wheels journalled on said frame, one of said wheels comprising a sheet metal disc carrying a peripheral, inwardly-extending flange, and said flange being formed with perforations meshing with the teeth of said gear.

6. In a lawn mower, a sheet-metal frame, a blade-carrying shaft journalled in said frame, a gear carried on said shaft without said frame, and a pair of wheels journalled on said frame, one of said wheels comprising a sheet metal disc formed with an integral peripheral, inwardly-extending flange, and said flange being formed with perforations meshing with the teeth of said gear.

7. In a lawn mower, a shaft, an element having a press fit on said shaft adjacent one end thereof, said element being formed with a pair of alined slots on opposite sides of said shaft, a member parallel with said element and having a press fit on said shaft adjacent the other end thereof, said member being formed with a pair of alined slots on opposite sides of said shaft, the slots of said member having a common axis perpendicular to the common axis of the slots of said element, and a pair of blade strips, each of said blade strips having a reduced extension at its one end entered in a slot of said element and headed over against said element, and each of said blade strips having a reduced extension at its opposite end entered in a slot of said member and headed over against said member.

8. In a lawn mower, a frame including a pair of spaced, parallel ears, said ears being formed with alined perforations, a rod mounted in said perforations, a pair of wheels mounted on the projecting ends of said rod, each of said wheels being formed with an aperture receiving a rod end, and with an inwardly concaved portion surrounding said aperture, and a sleeve cooperating with each of said wheels, each of said sleeves having a press fit on said rod, being received in said aperture, and being provided with a peripheral flange at its one end received within said concaved portion, one of said wheels being formed with dentations, a cutter reel journalled in said frame, and a toothed element carried by said reel and meshing with said dentations.

In witness whereof, I have hereunto set my hand at Marion, Indiana, this 20th day of February, A. D. one thousand nine hundred and thirty-one.

NEWELL H. MOTSINGER.